United States Patent
Rico Alvarino et al.

(10) Patent No.: US 10,506,591 B2
(45) Date of Patent: Dec. 10, 2019

(54) NARROWBAND DEFINITION FOR ENHANCED MACHINE TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 15/067,029

(22) Filed: Mar. 10, 2016

(65) Prior Publication Data
US 2016/0338062 A1    Nov. 17, 2016

Related U.S. Application Data

(60) Provisional application No. 62/162,623, filed on May 15, 2015.

(51) Int. Cl.
    *H04W 72/04* (2009.01)
    *H04W 4/70* (2018.01)
    *H04B 1/713* (2011.01)
    *H04B 1/7156* (2011.01)

(52) U.S. Cl.
    CPC ........ *H04W 72/0453* (2013.01); *H04B 1/713* (2013.01); *H04W 4/70* (2018.02); *H04B 1/7156* (2013.01)

(58) Field of Classification Search
    CPC ... H04W 72/0453; H04W 4/005; H04B 1/713
    See application file for complete search history.

(56) References Cited

U.S. PATENT DOCUMENTS

| | | |
|---|---|---|
| 9,622,230 B2 | 4/2017 | Chen et al. |
| 2002/0039888 A1* | 4/2002 | Hama .................... H04B 1/10 |
| 2013/0083753 A1 | 4/2013 | Lee et al. |

(Continued)

FOREIGN PATENT DOCUMENTS

WO    WO-2013173673 A2    11/2013

OTHER PUBLICATIONS

Ericsson: "PRB grouping for MTC," 3GPP Draft; R1-151207 PRB Grouping for MTC, 3rd Generation Partnership Project (3GPP), Mobile Competence Centre ; 650, Route Des Lucioles ; F-06921 Sophia-Antipolis Codex ; France vol. RAN WG1, no. Belgrade, Serbia; Apr. 20, 2015-Apr. 24, 2015 Apr. 19, 2015 (Apr. 19, 2015), XP050934087, Retrieved from the Internet: URL:http://www.3gpp.org/ftp/Meetings_3GPP_SYNC/RAN1/Docs/ [retrieved on Apr. 19, 2015], 4 pages.

(Continued)

*Primary Examiner* — Ronald B Abelson
(74) *Attorney, Agent, or Firm* — Patterson & Sheridan, L.L.P.

(57) ABSTRACT

Aspects of the present disclosure provide a method performed by a wireless device. The method generally includes identifying one or more narrowband regions within a wider system bandwidth, based on an amount of available resources in the system bandwidth, and communicating using at least one of the identified narrowband regions.

18 Claims, 13 Drawing Sheets

(56) References Cited

U.S. PATENT DOCUMENTS

| | | | | |
|---|---|---|---|---|
| 2013/0272215 | A1* | 10/2013 | Khoryaev | H04W 72/04 |
| 2014/0044040 | A1* | 2/2014 | Chen | H04W 24/02 |
| | | | | 370/328 |
| 2015/0029953 | A1* | 1/2015 | Chen | H04W 72/042 |
| | | | | 370/329 |
| 2016/0249327 | A1* | 2/2016 | Chen | H04W 72/04 |
| 2016/0127936 | A1* | 5/2016 | Chatterjee | H04W 24/10 |

OTHER PUBLICATIONS

International Search Report and Written Opinion—PCT/US2016/021936—ISA/EPO—dated May 25, 2016.

NEC; "Frequency Hopping Schemes for LTE Rel-13 MTC," 3GPP Draft; R1-150286 Frequency Hopping Design for LIE REL-13 MTC-CLN, 3rd Generation Partnership Project (3GPP), Mobile Competence Centre ; 650, Route Des Lucioles ; F-06921 Sophia-Antipolis Cedex vol. RAN WG1, no. Athens, Greece; Feb. 9, 2015-Feb. 13, 2015 Feb. 8, 2015 (Feb. 8, 2015), XP050933496, Retrieved from the Internet: URL:http://www.3gpp.org/ftp/Meetings_3GPP_SYNC/RAN1/Docs/ [retrieved on Feb. 8, 2015], 4 pages.

Sony: "MTC Operation using ePDCCH," 3GPP Draft; R1-150429, 3rd Generation Partnership Project (3GPP), Mobile Competence Centre ; 650, Route Des Lucioles ; F-06921 Sophia-Antipolis Cedex ; France , vol. RAN WG1, no. Athens, Greece; Feb. 9, 2015-Feb. 13, 2015 Feb. 8, 2015 (Feb. 8, 2015), XP050933637, Retrieved from the Internet: URL:http://www.3gpp.org/ftp/Meetings_3GPP_SYNC/RAN1/Docs/ [retrieved on Feb. 8, 2015], 16 pages.

NEC: "Coverage enhancement for Rel-13 low complexity UEs," 3GPP Draft, R1-144860, 3GPP TSG RAN WG1, Meeting #79, San Francisco, USA, Nov. 17-21, 2014, 4 pp., XP050875922, Retrieved from the Internet: URL: http://www.3gpp.org/ftp/Meetings_3GPP_SYNC/RAN1/Docs/ [retrieved on Nov. 17, 2014].

* cited by examiner

NARROWBAND DEFINITION FOR ENHANCED MACHINE TYPE COMMUNICATION

CROSS-REFERENCE TO RELATED APPLICATION

This application claims priority to U.S. Provisional Patent Application No. 62/162,623, filed on May 15, 2015, which is hereby expressly incorporated by reference in its entirety.

BACKGROUND

I. Field of the Invention

Certain aspects of the present disclosure generally relate to wireless communications and, more particularly, to narrowband definitions for enhanced machine type communication(s) (eMTC).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered enhanced or evolved machine-type communication (eMTC) UEs that may communicate with a base station, another device (e.g., remote device), or some other entity. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method, performed by a wireless device. The method generally includes identifying one or more narrowband regions within a wider system bandwidth, based on an amount of available resources in the system bandwidth, and communicating using at least one of the identified narrowband regions.

Certain aspects of the present disclosure provide an apparatus for wireless communications. The apparatus generally includes at least one processor configured to identify one or more narrowband regions within a wider system bandwidth, based on an amount of available resources in the system bandwidth, and communicate using at least one of the identified narrowband regions, and a memory coupled to the at least one processor.

Certain aspects of the present disclosure provide an apparatus for wireless communications. The apparatus generally includes means for identifying one or more narrowband regions within a wider system bandwidth, based on an amount of available resources in the system bandwidth, and means for communicating using at least one of the identified narrowband regions.

Certain aspects of the present disclosure provide a computer-readable medium for wireless communications. The computer-readable medium generally includes code to identify one or more narrowband regions within a wider system bandwidth, based on an amount of available resources in the system bandwidth, and code to communicate using at least one of the identified narrowband regions.

Numerous other aspects are provided including methods, apparatus, systems, computer program products, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

DETAILED DESCRIPTION

Aspects of the present disclosure provide techniques that may be used to define narrowband regions for enhanced machine type communication (eMTC), performed by a wireless device.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
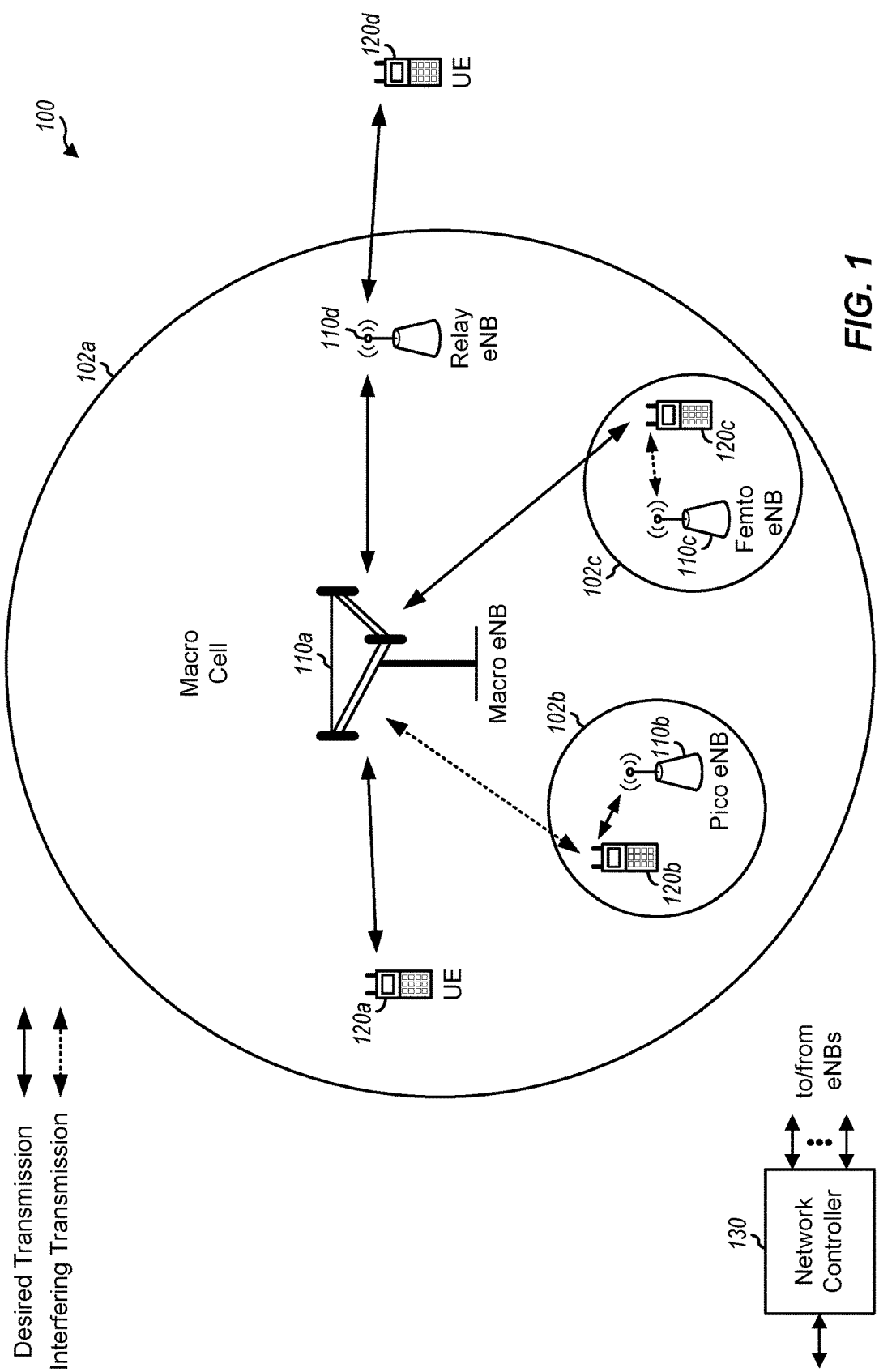
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help define narrowband regions for enhanced machine type communication (eMTC), performed by a wireless device.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. Some examples of UEs may include cellular phones, smart phones, personal digital assistants (PDAs), wireless modems, handheld devices, tablets, laptop computers, netbooks, smartbooks, ultrabooks, entertainment devices (e.g., gaming devices, music players), navigation devices, cameras, wearable devices (e.g., smart watches, smart clothing, smart glasses, smart goggles, heads-up display devices, smart wrist bands, smart jewelry (e.g., smart ring, smart bracelet)), medical devices, healthcare devices, vehicular devices, etc. MTC UEs may include sensors, meters, monitors, security devices, location tags, robots/robotic devices, drones, etc. Some MTC UEs, and other UEs, may be implemented as internet of things (IoT) (e.g., narrowband IoT (NB-IoT)) or internet of everything (IoE) devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
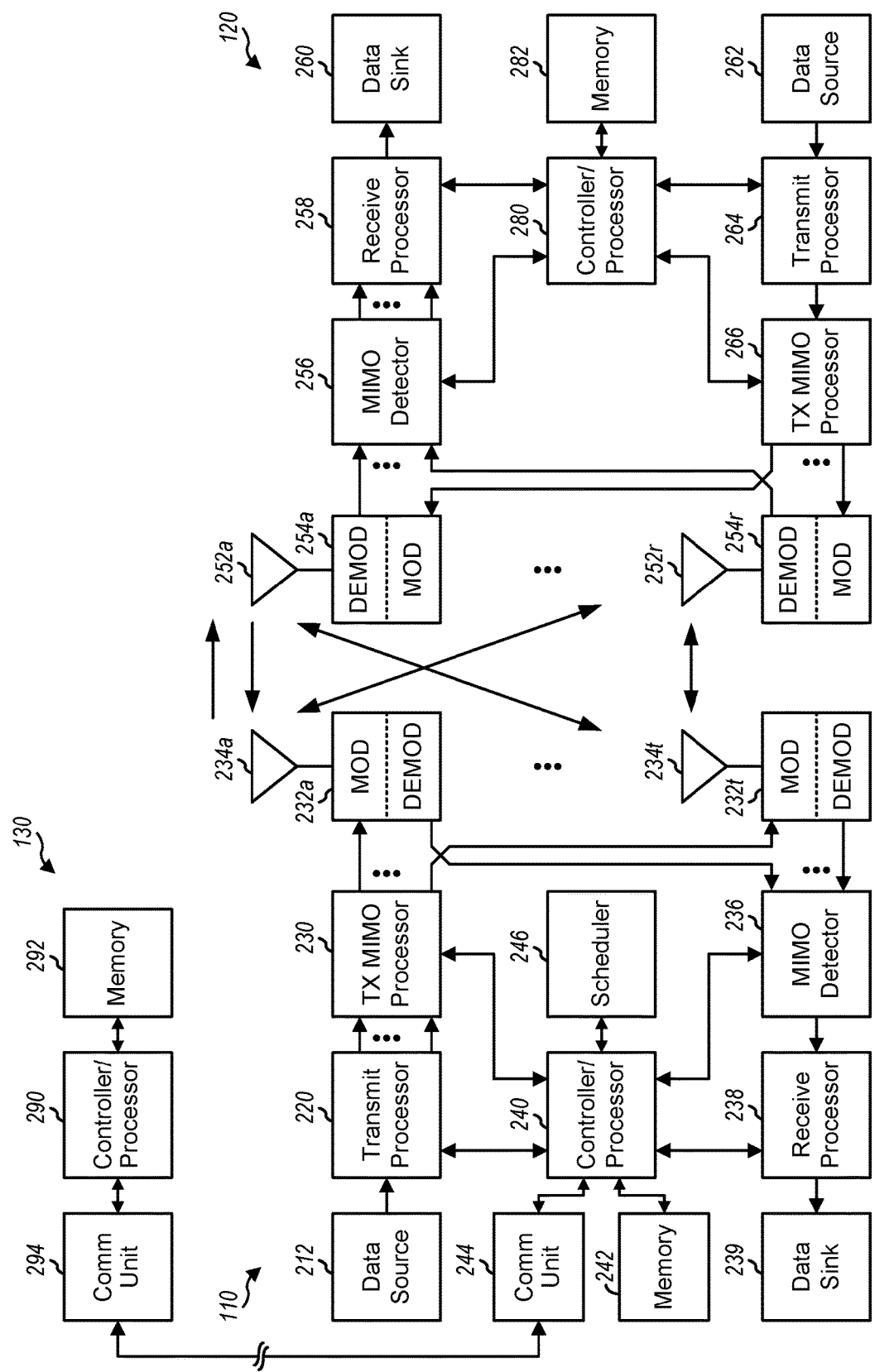
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for defining narrowband regions for enhanced machine type communication (eMTC) to use for communications between a UE (e.g., an eMTC UE) and a base station (e.g., an eNodeB). For example, controller/processor 240 and/or other controllers, processors and modules at base station 110, and controller/processor 280 and/or other controllers, processors and modules at UE 120, may perform or direct operations of base station 110 and UE 120, respectively. For example, controller/processor 240 and/or other controllers, processors and modules at base station 110, may perform or direct operations 600 shown in FIG. 6. For example, controller/processor 280 and/or other controllers, processors and modules at UE 120, may perform or direct operations 600 shown in FIG. 6. Memories 242 and 282 may store data and program codes for base station 110 and UE 120, respectively. A scheduler 246 may schedule UEs for data transmission on the downlink and/or uplink.

Figure 3:
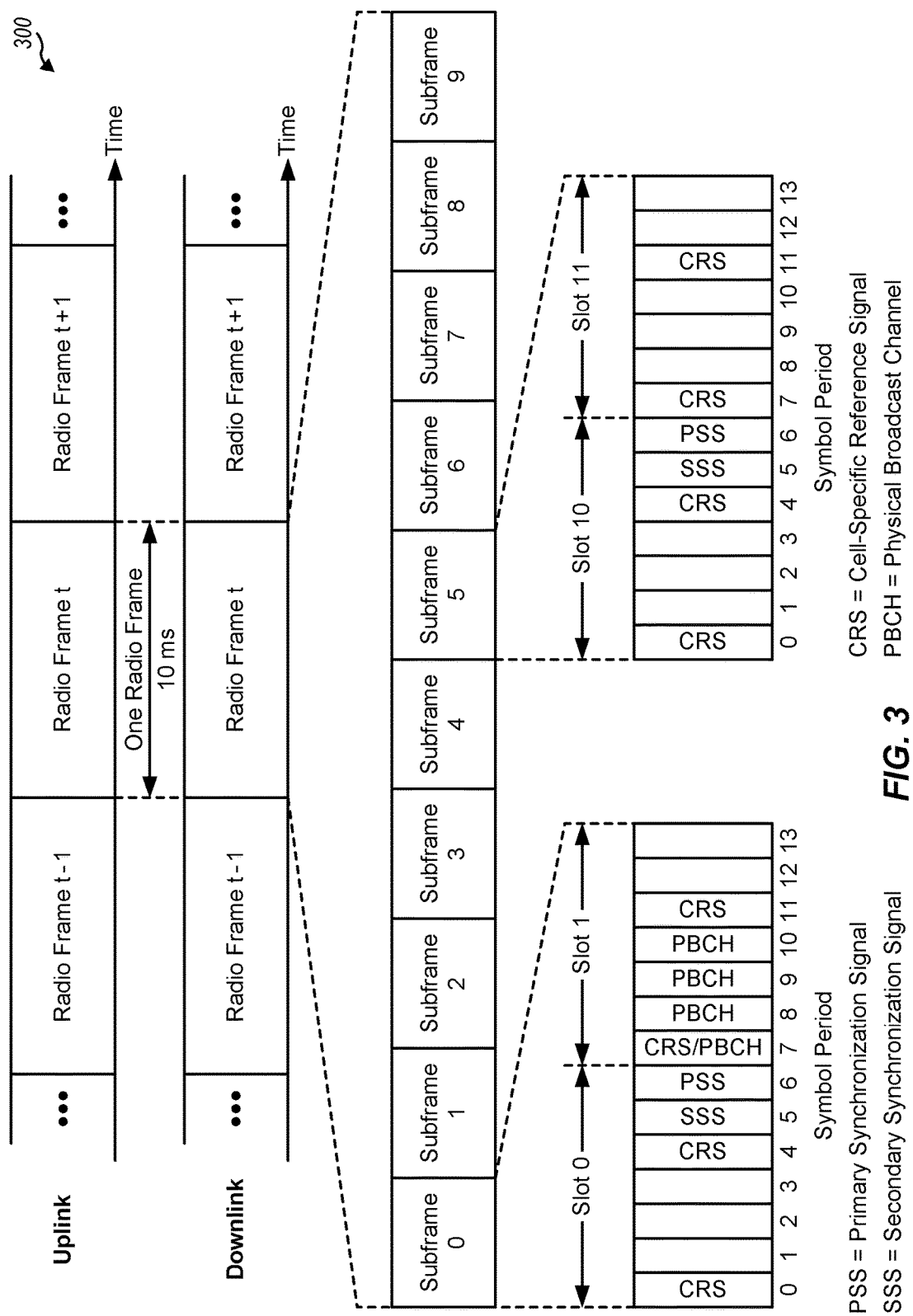
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
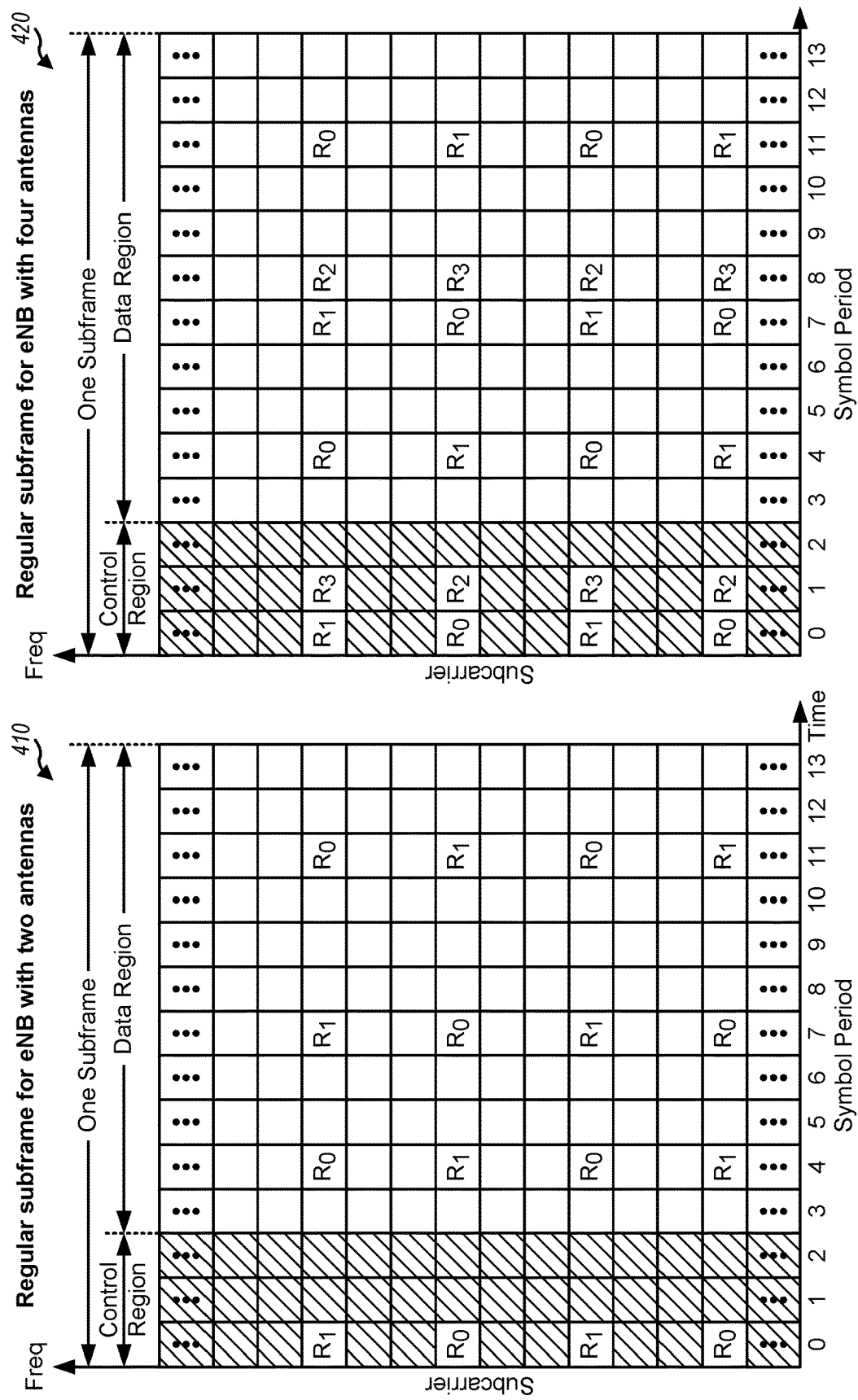
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Narrowband EMTC

As noted above, techniques presented herein may be used to help UEs (e.g., eMTC UEs) determine narrowbands and hopping pattern for use with eMTC.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, relative to legacy UEs, maximum bandwidth may be reduced, a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
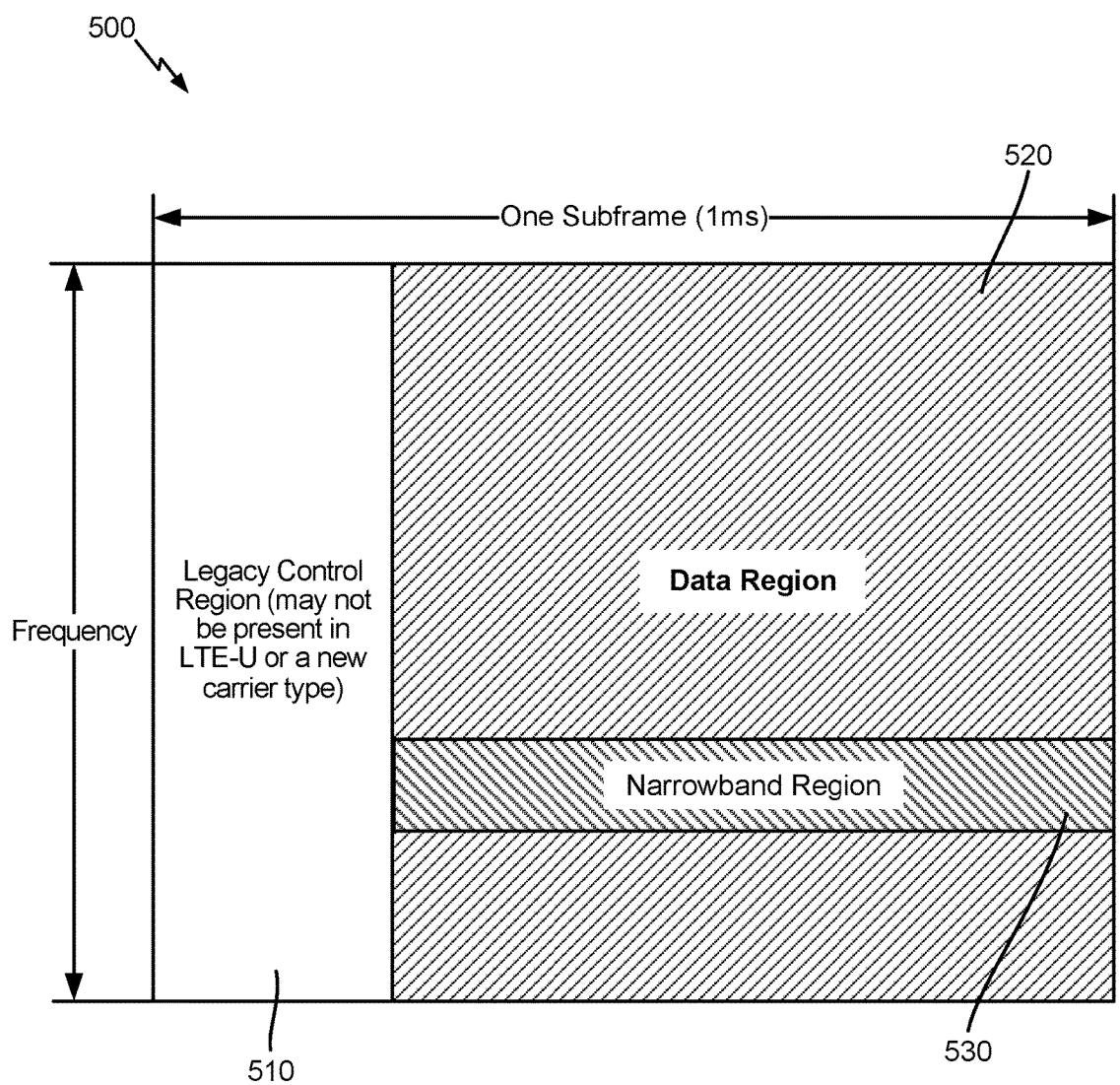
FIG. 5 illustrates an exemplary subframe configuration for eMTC, in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 occupies a portion of a larger region 520 of the system bandwidth. In some cases, an MTC UE monitoring the narrowband region may operate at 1.4 MHz or 6 resource blocks (RBs).

As noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks) within the system bandwidth. As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

While the size of DL and UL narrowband regions are defined, the location of the available narrowbands and hopping pattern for eMTC UEs within the larger bandwidth is not fixed and may need definition.

As bandwidth is a limited resource, narrowband regions should be defined such that all or almost all RBs are grouped into a narrowband region with as few empty RBs as possible. In certain systems, the number of PRBs within a given bandwidth is not a multiple of six. A narrowband region of 6 RBs operates at 1.4 MHz, while system bandwidths may be 1.4, 3, 5, 10, 15, and 20 MHz, corresponding to 6, 15, 25, 50, 75, and 100 RBs, only one of which is a multiple of 6. For example, a 5 MHz bandwidth cell has 15 PRBs available, which equals 2.5 narrowband regions. Thus, for many LTE bandwidths, the system bandwidth cannot be evenly split into narrowband regions. It may be advantageous to define narrowband regions such as to minimize the number of RBs that are not grouped into narrowband regions.

Narrowband Definitions for EMTC

Figure 6:
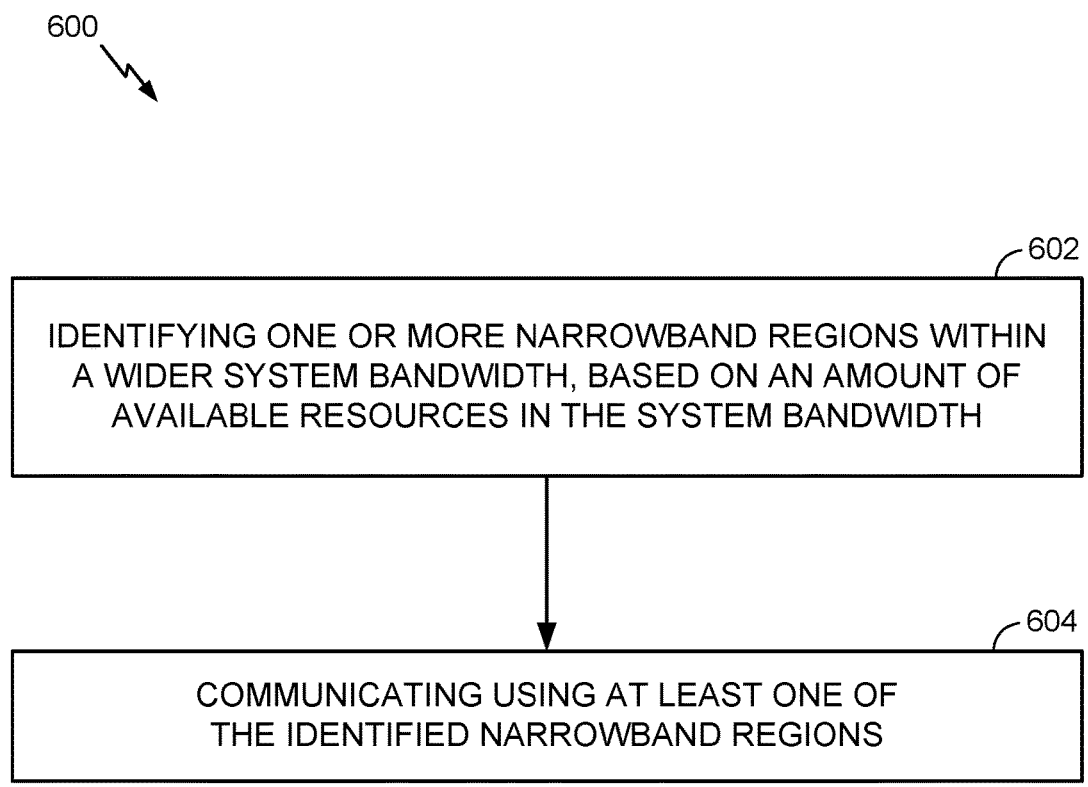
FIG. 6 is a flow diagram illustrating example operations for wireless communications by a wireless device, in accordance with certain aspects of the present disclosure.

FIG. 6 is a flow diagram illustrating example operations 600 for wireless communications by a wireless device, in accordance with certain aspects of the present disclosure.

The wireless device may be, for example, an eNB to communicate with UEs over narrowband regions, or a UE to communicate with eNBs over narrowband regions. The operations may begin, at 602, by identifying one or more narrowband regions within a wider system bandwidth, based on an amount of available resources in the system bandwidth. At 604, the operations include communicating using at least one of the identified narrowband regions.

Figure 7:
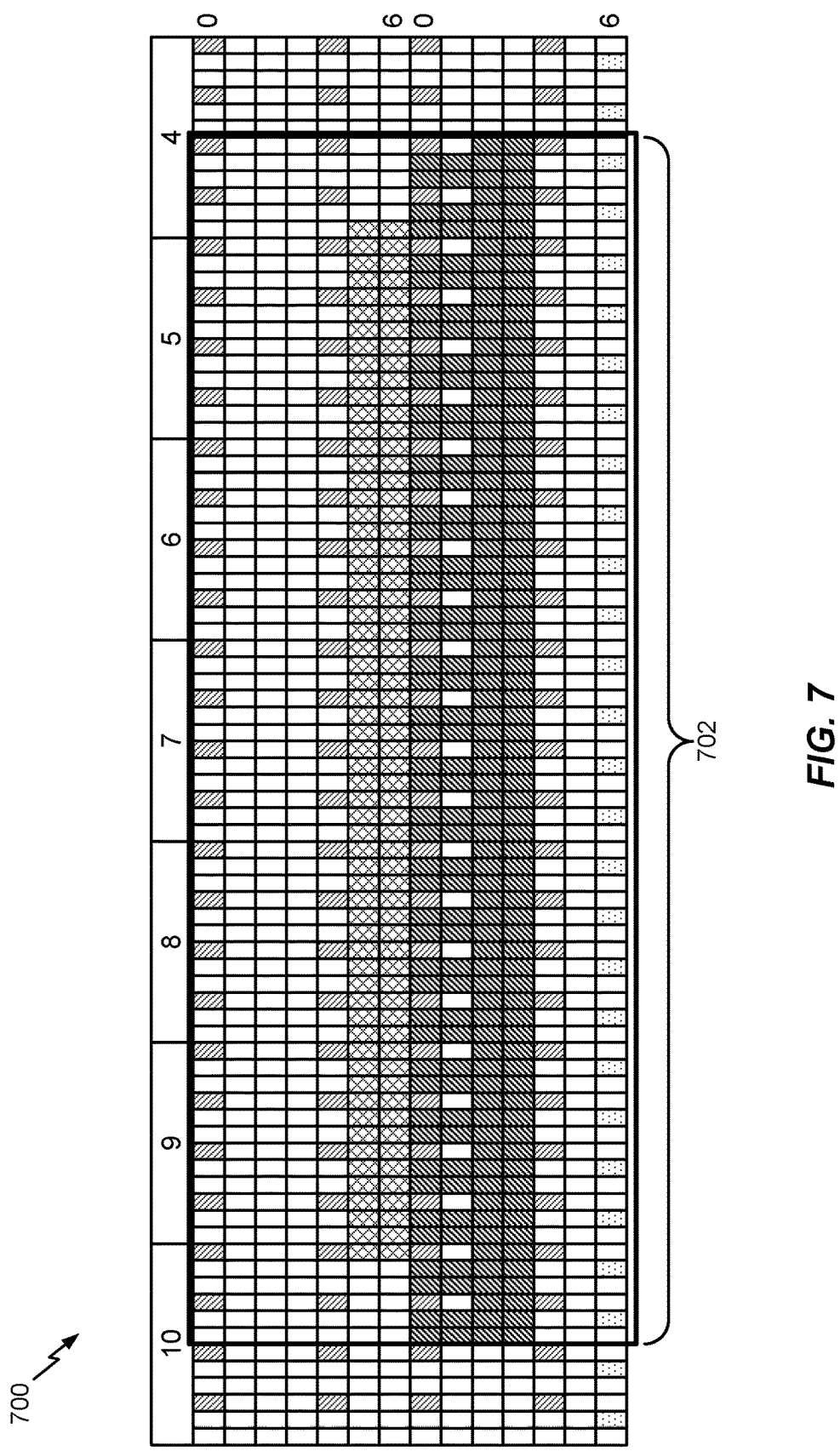
FIG. 7 illustrates an exemplary resource block configuration for eMTC operations, in accordance with certain aspects of the present disclosure.

FIG. 7 illustrates an exemplary resource block configuration 700 for eMTC operations, in accordance with certain aspects of the present disclosure. In certain systems, the center 6 RBs may be used for PSS/SSS and/or paging. For bandwidths with an odd number of RBs (e.g., 1.4 MHz, 3 MHz, 5 MHz, etc.), the central 6 RBs may not be aligned with physical resource blocks. For example, as shown in FIG. 6, the center 6 RBs 702 for a 3 MHz bandwidth are resource blocks 5-9 and half of resource block 4 and half of resource block 10. Where a narrowband region is defined in the center 6 RB, an eMTC tuned to the narrowband region for synchronization purposes would not need to retune to receive paging transmissions, potentially resulting in energy savings.

Figure 8A:
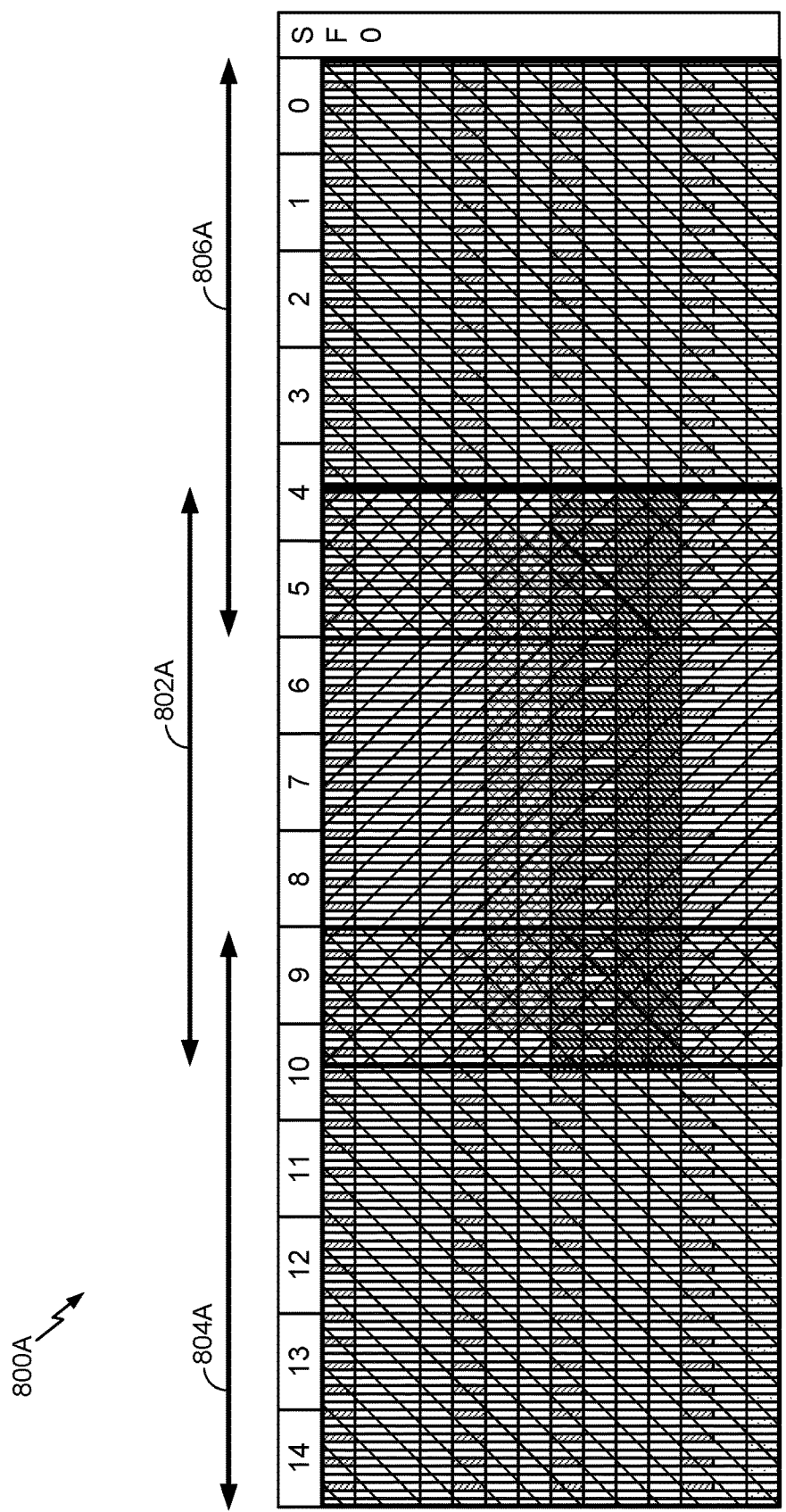
FIGS. 8A-8C illustrate example narrowband region definitions, in accordance with certain aspects of the present disclosure.

FIG. 8A illustrates an example narrowband region definition 800A, in accordance with certain aspects of the present disclosure. According to certain aspects, a narrowband region, 802A, may be defined based on the center 6 RB. Where the number of available RBs is not even and center 6 RBs are not aligned with the wideband RB boundaries, narrowband region 802A may also not be aligned with the wideband RB boundaries. For example, narrowband (NB) region 802A may be defined as extending from RB 4.5 to RB 10.5. Alternatively, the center 6 RB region may be rounded up one RB to 7 RBs. Wideband and eMTC devices may continue to monitor only the center 6 RBs for paging, but also by extending the region 0.5 RB above and below the center 6 RB, for example, extending from RB 4 to RB 11. This allows NB region 802A to be aligned with the wideband RB boundaries. Groups of 6 RBs from the wideband edges may then be defined as narrowband regions, in this case, NB region 804A and NB region 806A, until the entire wideband bandwidth is divided into narrowband regions. Where the total wideband bandwidth is not divisible evenly into 6 RB regions, overlap between the narrowband regions will occur. Here, for example, NB region 804A and NB region 806A would both overlap with NB region 802A. This results in a total number of narrowband regions equal to the ceiling of the number of resource blocks divided by 6, or ceil(nRB/6).

In certain cases, it may be desirable to have non-overlapping narrowband regions. As noted above, where the total number of RBs is not a multiple of six, it is not possible to divide the total number of RBs into fixed sized narrowband regions such that each wideband RB is used. However, using smaller sized narrowband regions in conjunction with the 6 RB narrowband region would allow for each wideband RB to be used. For example, where the center 6 RBs have been rounded up to 7 to align with the wideband RB boundaries, narrowband regions may be selected in groups of 6 RBs inward from each edge.

Figure 8B:
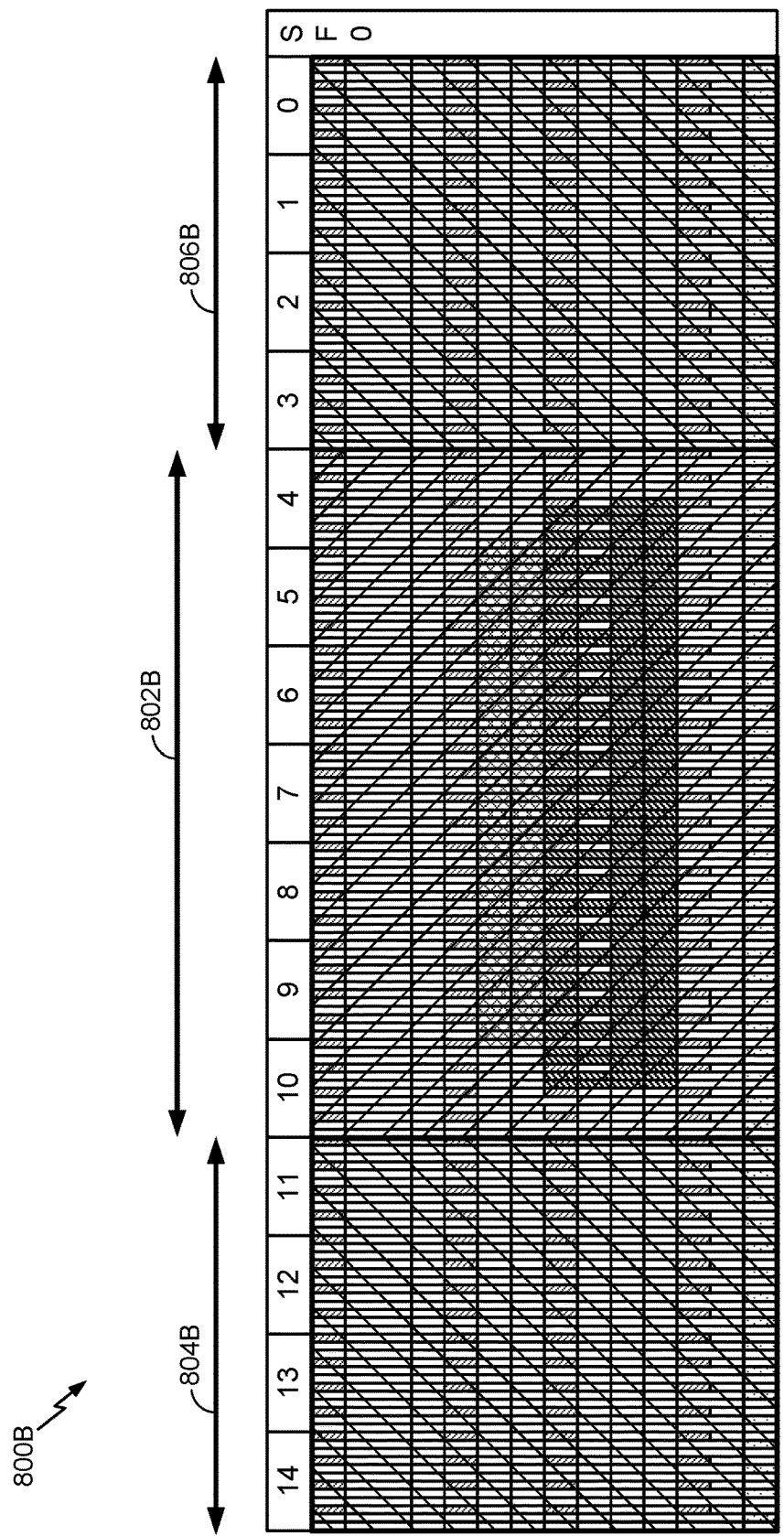
Figure 8C:
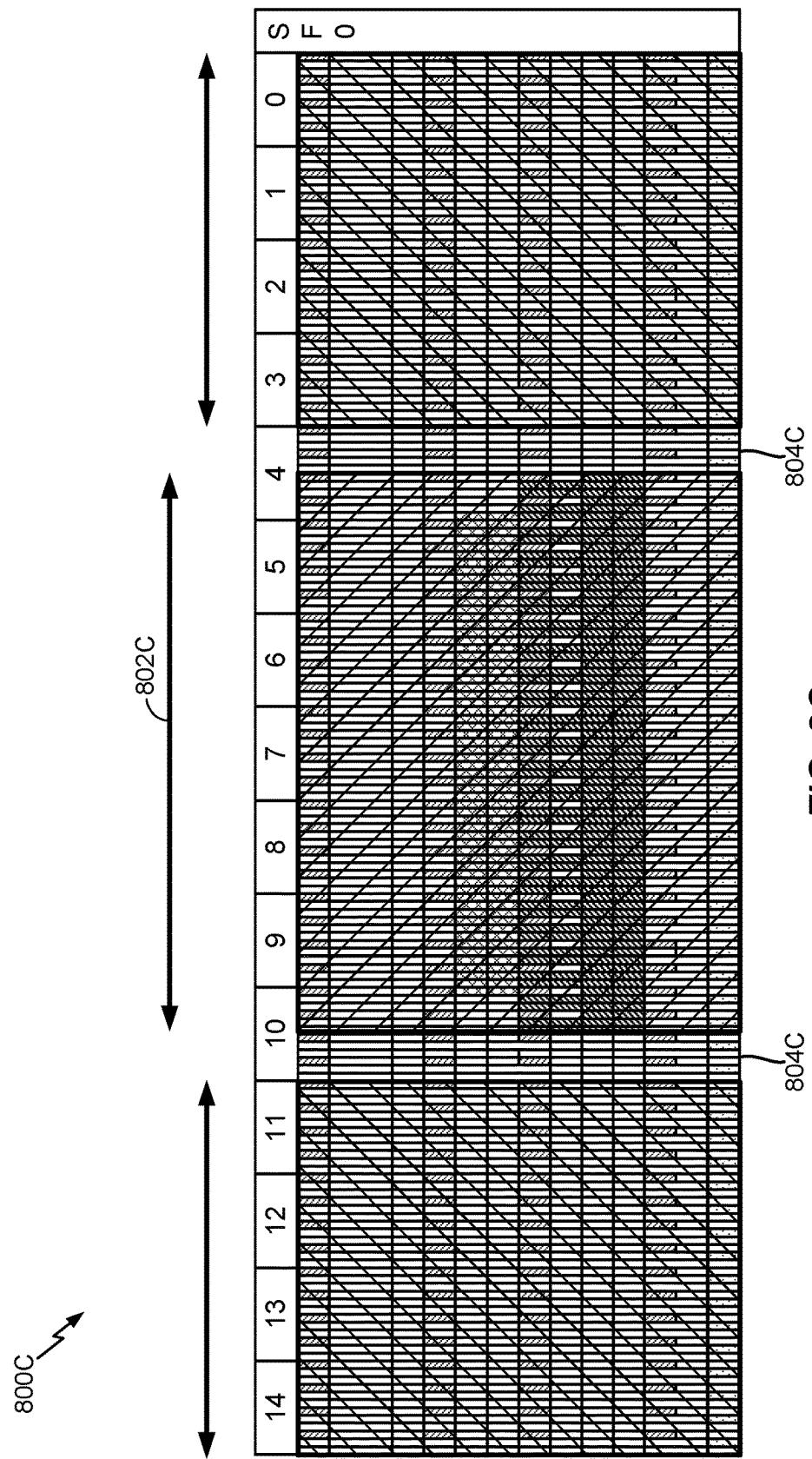

FIG. 8B illustrate example narrowband region definition 800B, in accordance with certain aspects of the present disclosure. As illustrated in FIG. 8B, the narrowband regions directly adjacent to NB region 802B, rather than overlapping the NB region 802B, are reduced in size. As illustrated here, NB region 804B and NB region 806B are 4 RBs rather than 6 RBs. Such an arrangement would place the smaller narrowband regions next to the NB region 802B. Alternatively, NB regions may be selected in groups of 6 RBs outward from the NB region 802B. Such an arrangement would place the smaller narrowband regions next to the edges of the wideband bandwidth. As seen in FIG. 8C, in example narrowband region definition 800C where the center 6 RBs have not been rounded up, half an RB to either side of the NB region 802C may be left unassigned 804C to narrowband regions. This applies, e.g., only to wideband bandwidths with an odd number of RBs.

In certain systems, the narrowband mapping may be different for uplink and downlink. For example, on the downlink, some systems use the center 6 RB for PSS/SSS/PBCH and/or paging. However, no such requirements may exist on the uplink. For simplicity, downlink narrowband regions may be aligned based on the center 6 RBs. Alternatively, uplink narrowband regions may also be defined such that there are smaller narrowband regions along the edges of the wideband bandwidth reserved for PUCCH.

Figure 9A:
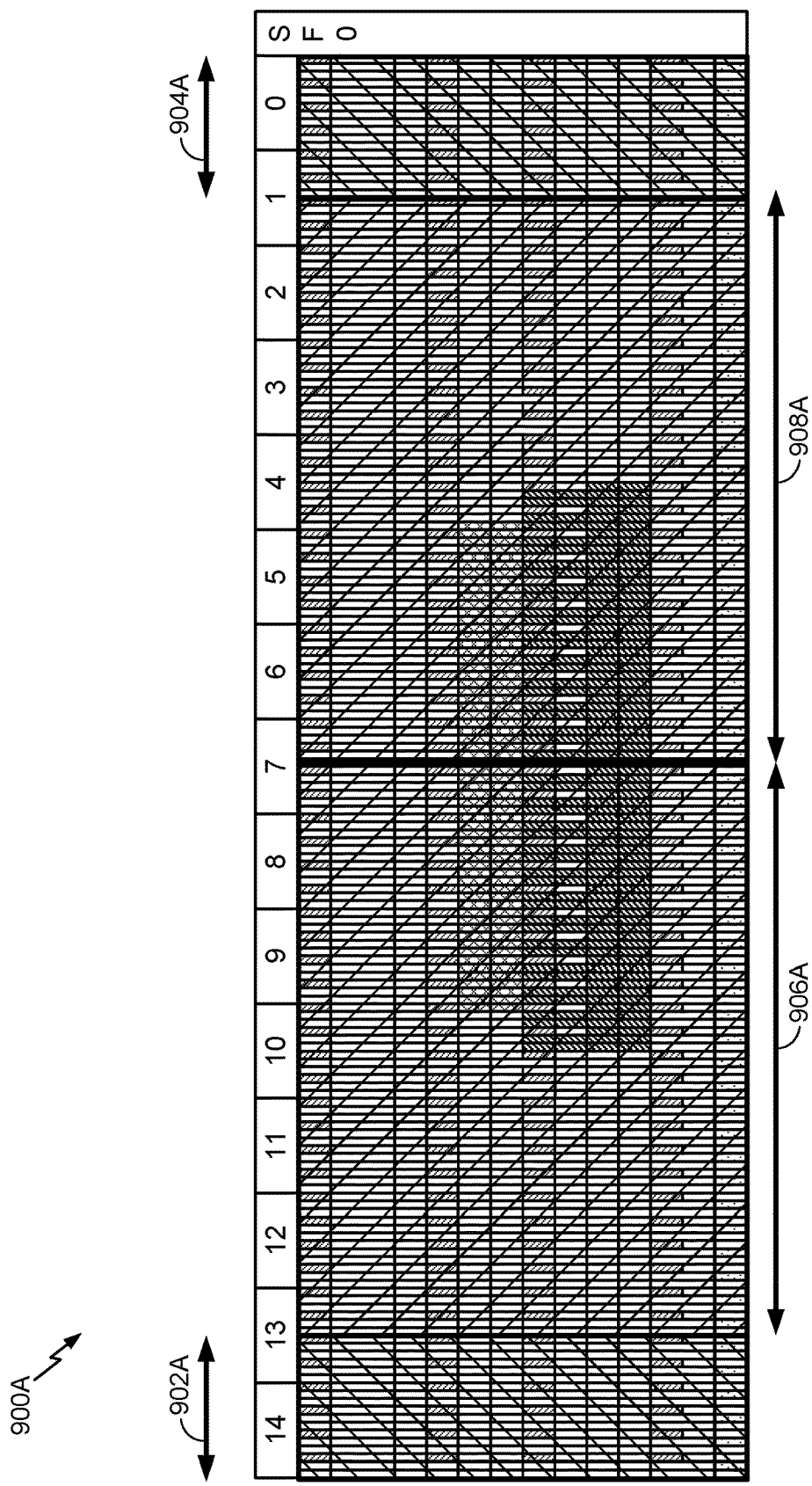
FIGS. 9A-9C illustrate example narrowband region definitions, in accordance with certain aspects of the present disclosure.
Figure 9B:
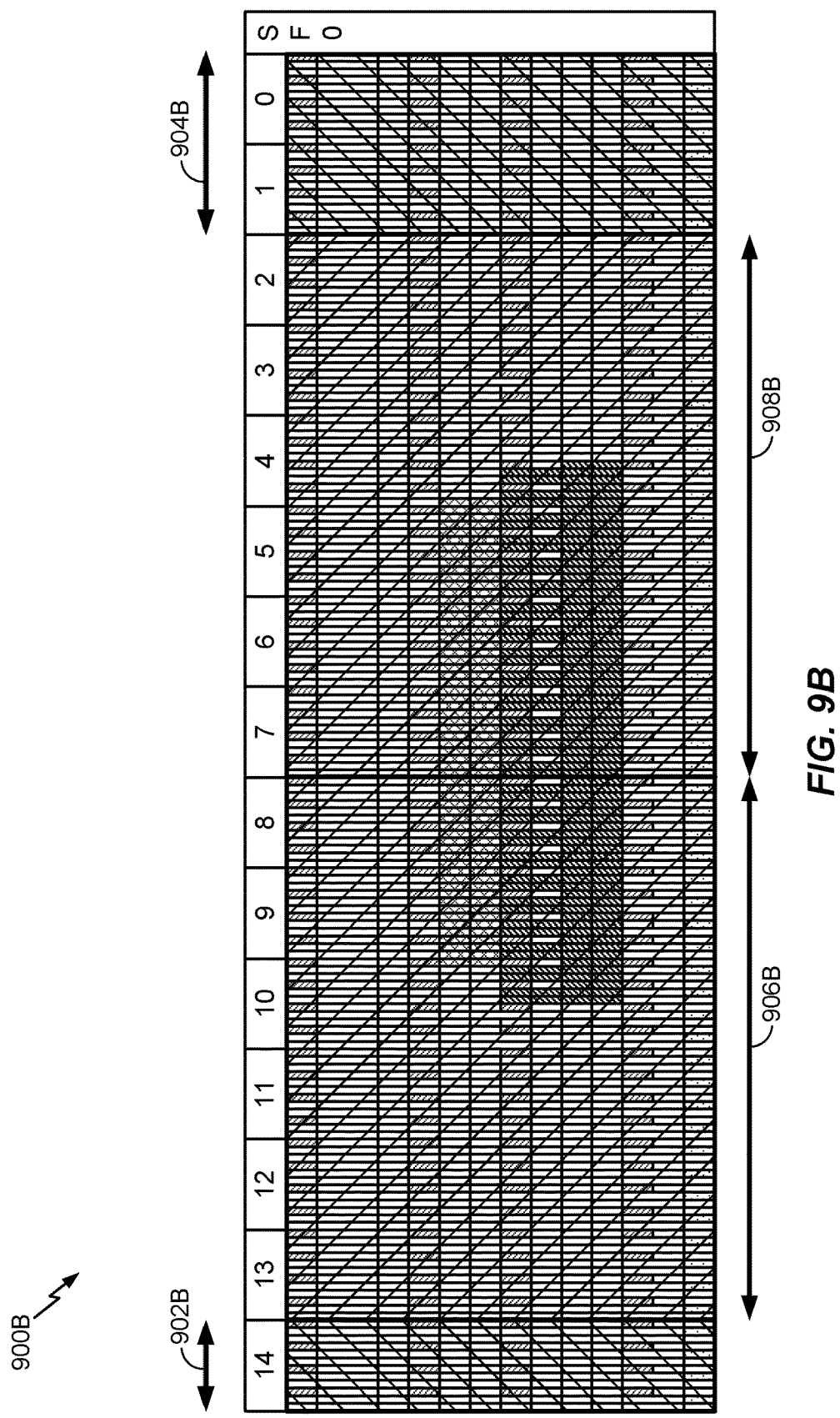
Figure 9C:
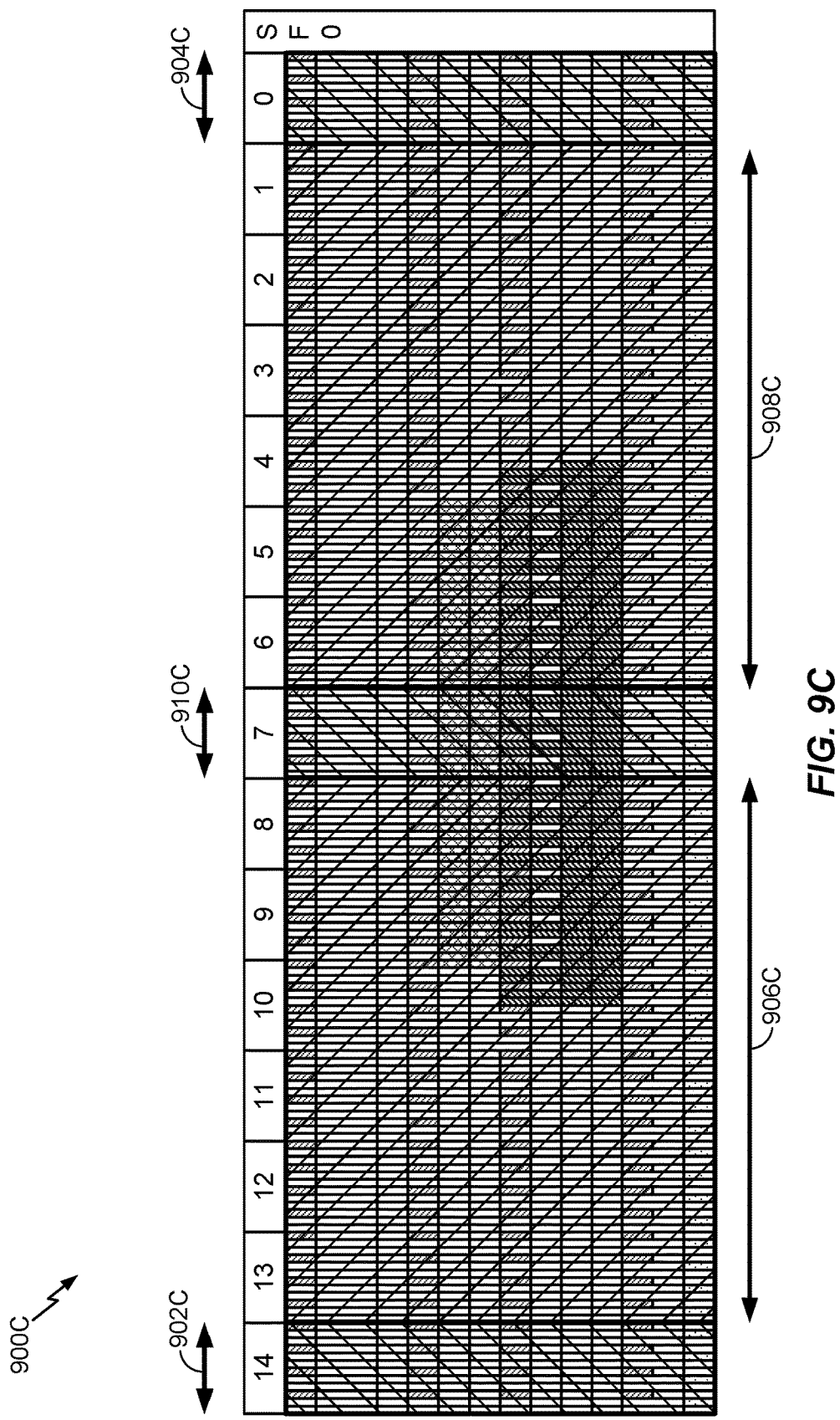

FIGS. 9A-9C illustrate example narrowband region definitions 900A-900C, respectively, in accordance with certain aspects of the present disclosure. In certain cases, the smaller narrowband regions may be defined such that the total number of resource blocks divided by 6 (e.g., mod (nRB, 6)) are allocated at the bandwidth edges for the smaller narrowband regions. These RBs may be allocated equally between the edges such that the individual sizes of the smaller RBs equals, e.g., (mod(nRB, 6))/2. Narrowband regions of 6 RBs may then be allocated between the edges. For example, for a 3 MHz, 15 RB wideband bandwidth in FIG. 9A, mod(15, 6) yields 3 RBs, which are split into two 1.5 RB narrowband regions NB region 902A and NB region 904A along the edge of the wideband bandwidth. The remaining RBs between the edges may then be equally allocated into 6 RB narrowband regions, as shown in NB region 906A and NB region 908A. However, equally dividing RBs along the edges into narrowband regions may result in fractional RB allocations, as in NB region 902A and NB region 904A, as well as narrowband regions that may not be aligned with the wideband RBs, such as NB region 906A and NB region 908A in RB 7.

Where a center 6 RB alignment is not being maintained, the RB distribution into narrowband regions may be asymmetrical. The asymmetrical distribution may allow the narrowband regions to be aligned with the wideband RBs where there is an odd number of wideband RBs. For example, as illustrated in FIG. 8B, where the individual sizes of the smaller RBs, as determined by (mod(nRB, 6))/2, results in a non-integer, one of the smaller narrowband regions may be rounded down (NB region 902B), here to one RB, and the other smaller narrowband region rounded up (NB region 904B), here two RBs. This rounding allows the narrowband edges to be aligned with the wideband RB edges. Other narrowband regions, such as NB region 906B and NB region 908B may also be adjusted to be aligned with the wideband RB edges.

Alternatively, rather than rounding the size of one smaller narrowband region up and the other down, the size of both smaller narrowband regions may be rounded down. For example, as illustrated in FIG. 8C, both NB region 902C and NB region 904C are rounded down to 1 RB each. Additional narrowband regions, e.g., NB region 906C and NB region 908C, between the edges may then be defined. A remaining RB in the center RB may then be defined as an additional smaller narrowband region NB region 910C, such that smaller narrowband regions are defined both at the edge and in the center of the wideband bandwidth.

Narrowband Frequency Hopping for EMTC

LTE includes hopping between frequencies in a particular pattern to improve transmission diversity. This hopping pattern may be signaled to eMTC devices explicitly in the scheduling grant. For eMTC devices, the flexibility offered by explicit signaling may be outweighed by the additional power usage to monitor for the signaling. According to certain aspects, signaling may be simplified by basing the hopping pattern on the initial narrowband region used for communications. This hopping may be performed within a pair of narrowband regions, or based on a fixed pattern.

As an example, for a 10 MHz bandwidth with 9 narrowband regions numbered from 0 to 8, four sets of narrowband pairs may be defined. These narrowband pairs may be, for example, {0,5}, {1,6}, {2,7}, and {3,8}. Hopping behavior may be defined such that hopping may be performed from one member of the narrowband pair to the other member of the narrowband pair. The specific hopping behavior then is based on the narrowband region initially identified for communications. That is, where a particular wireless device receives an indication that it is to use narrowband region 0 initially for communications, the wireless device would know to next hop to narrowband region 5 for the next communication, without any other additional signaling. This initial indication may be derived from SIB, MIB, or other types of signaling. Additionally, hopping may be performed based off a pattern rather than reciprocal hopping. In such implementations, an initial hop forward of five narrowband regions from 0 to 5 may be followed by a hop back of four narrowband regions, e.g., from 5 to 1. In either case, the hopping pattern, e.g., for a given bundle size, is predetermined (e.g., fixed by specification or SIB1/other signaling) based on the initially identified narrowband region and there is no need to signal the specific pattern in a downlink or uplink grant. Additionally, specific patterns and pairs may be defined for each of the system bandwidths (e.g., 3, 5, 10, 15, and 20 MHz).

In certain systems, frequency hopping patterns may be further defined such that, for example, the initially identified narrowband region used for downlink is associated with a narrowband region hopping for the uplink, and vice versa. For example, again for a 10 MHz bandwidth, where a particular wireless device receives an indication that it is to use narrowband region 0 initially for downlink, the wireless device would know to next hop to an associated uplink narrowband region 5 for sending a response. Likewise, receiving a DL grant on a particular narrowband region may indicate to the wireless device to hop to an associated downlink narrowband region to receive the downlink transmission. Similarly, an UL grant on a particular narrowband region may indicate to the wireless device to hop to an associated uplink narrowband region to transmit. Similarly, a random access uplink transmission on a particular narrowband region may indicate to the wireless device to hop to an associated downlink narrowband region to receive the random access response.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Software shall be construed broadly to mean instructions, data, code, or any combination thereof, whether referred to as software, firmware, middleware, code, microcode, hardware description language, machine language, or otherwise. Generally, where there are operations illustrated in figures, those operations may have corresponding counterpart means-plus-function components.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for identifying and/or means for communicating may include one or more processors or other elements, such as the transmit processor 220, the controller/processor 240, the receive processor 238, and/or antenna(s) 234 of the base station 110 illustrated in FIG. 2 or the transmit processor 264, the controller/processor 280, the receive processor 258, and/or antenna(s) 252 of the user equipment 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a wireless device, comprising:
   receiving an indication of an initial narrowband region within a wider system bandwidth;
   identifying one or more narrowband regions within the wider system bandwidth according to a hopping pattern, wherein each hop according to the hopping pattern is based on at least the indication of the initial narrowband region, wherein the identifying comprises identifying a downlink narrowband region; and
   communicating in an uplink narrowband region based on at least the identification of the downlink narrowband region.

2. The method of claim 1, further comprising receiving or transmitting signaling indicating the hopping pattern.

3. The method of claim 1, wherein the wireless device comprises one of a user equipment or a base station.

4. A method for wireless communications by a wireless device, comprising:
   receiving an indication of an initial narrowband region within a wider system bandwidth; identifying one or more narrowband regions within the wider system bandwidth according to a hopping pattern, wherein each hop according to the hopping pattern is based on at least the indication of the initial narrowband region, wherein the identifying comprises:
   identifying a first set of narrowband regions; and
   identifying a second set of narrowband regions each comprising less resource blocks than each narrowband region of the first set of narrowband regions; and
   communicating using at least one of the identified one or more narrowband regions.

5. The method of claim 4, wherein each narrowband region of the first set of narrowband regions comprises at least six resource blocks.

6. The method of claim 4, wherein:
   each narrowband region of the first set of narrowband and regions is aligned with a resource block; and
   each narrowband region of the second set of narrowband regions comprises a different number of resource blocks.

7. The method of claim 6, wherein the first set of narrowband regions are adjacent to a narrowband region located at a center of the system bandwidth.

8. The method of claim 4, wherein identifying the second set of narrowband regions comprises:
- identifying a total number of resource blocks allocated to the second set of narrowband regions; and
- determining at least one location of the second set of narrowband regions based on the total number of resource blocks allocated.

9. The method of claim 8, wherein the determining the at least one location of the second set of narrowband regions comprises:
- determining the total number of resource blocks allocated is odd; and
- identifying a first and second narrowband regions of the second set of narrowband regions, wherein the first and second narrowband regions comprise less than the total number of resource blocks allocated for the second set of narrowband regions.

10. The method of claim 9, further comprising:
- identifying a third narrowband region of the second set of narrowband regions, wherein the first, second, and third narrowband regions comprise a number of resource blocks equal to the total number of resource blocks allocated for the second set of narrowband regions.

11. The method of claim 10, wherein the third narrowband region comprises at least a center resource block of the system bandwidth and wherein the first and second narrowband regions are located at edges of the system bandwidth.

12. A method for wireless communications by a wireless device, comprising:
- receiving an indication of an initial narrowband region within a wider system bandwidth;
- identifying one or more narrowband regions within the wider system bandwidth according to a hopping pattern, wherein each hop according to the hopping pattern is based on at least the indication of the initial narrowband region, wherein the identifying comprises identifying narrowband regions in uplink and downlink subframes based on the hopping pattern; and
- communicating using at least one of the identified one or more narrowband regions.

13. The method of claim 12, further comprising receiving or transmitting signaling indicating the hopping pattern between uplink and downlink narrowband regions.

14. The method of claim 12, further comprising communicating in an associated downlink narrowband region based on at least an identification of a downlink narrowband and region.

15. The method of claim 12, further comprising communicating in a downlink narrowband region based on at least an identification of an uplink narrowband region.

16. An apparatus for wireless communications, comprising:
- at least one processor;
- a memory coupled to the at least one processor, the memory comprising instructions executable by the at least one processor to cause the apparatus to:
  - receive an indication of an initial narrowband region within a wider system bandwidth;
  - identify one or more narrowband regions within the wider system bandwidth according to a hopping pattern, wherein each hop according to the hopping pattern is based on at least the indication of the initial narrowband region, wherein the identifying comprises identifying a downlink narrowband region; and
  - communicate in an uplink narrowband region based on at least the identification of the downlink narrowband region.

17. An apparatus for wireless communications, comprising:
- means for receiving an indication of an initial narrowband region within a wider system bandwidth;
- means for identifying one or more narrowband regions within the wider system bandwidth according to a hopping pattern, wherein each hop according to the hopping pattern is based on at least the indication of the initial narrowband region, wherein the identifying comprises identifying a downlink narrowband region; and
- means for communicating in an uplink narrowband region based on at least the identification of the downlink narrowband region.

18. A non-transitory computer-readable medium for wireless communications, comprising:
- code to receive an indication of an initial narrowband region within a wider system bandwidth;
- code to identify one or more narrowband regions within the wider system bandwidth according to a hopping pattern, wherein each hop according to the hopping pattern is based on at least the indication of the initial narrowband region, wherein the identifying comprises identifying a downlink narrowband region; and
- code for communicating in an uplink narrowband region based on at least the identification of the downlink narrowband region.

* * * * *